(12) United States Patent
Ge et al.

(10) Patent No.: US 9,152,444 B2
(45) Date of Patent: Oct. 6, 2015

(54) TECHNIQUES USED BY A VIRTUAL MACHINE IN COMMUNICATION WITH AN EXTERNAL MACHINE AND RELATED VIRTUAL MACHINE SYSTEM

(71) Applicant: International Business Machines Corporation, Armonk, NY (US)

(72) Inventors: Yi Ge, Beijing (CN); Li Li, Beijing (CN); Liang Liu, Beijing (CN); Jun Mei Qu, Beijing (CN); Yu Yuan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 13/735,250

(22) Filed: Jan. 7, 2013

(65) Prior Publication Data

US 2013/0185474 A1    Jul. 18, 2013

(30) Foreign Application Priority Data

Jan. 18, 2012  (CN) .......................... 2012 1 0016848

(51) Int. Cl.
*G06F 12/00* (2006.01)
*G06F 9/455* (2006.01)
*G06F 9/54* (2006.01)

(52) U.S. Cl.
CPC ........ *G06F 9/45533* (2013.01); *G06F 9/45558* (2013.01); *G06F 9/544* (2013.01); *G06F 2009/45583* (2013.01)

(58) Field of Classification Search
USPC ..................................................... 711/6, 203
See application file for complete search history.

(56) References Cited

U.S. PATENT DOCUMENTS

2010/0217916 A1    8/2010    Gao et al.
2011/0145821 A1    6/2011    Philipson et al.

OTHER PUBLICATIONS

M. Jeon et al., "Domain Level Page Sharing in Xen Virtual Machine Systems," CS Division, Korea Advanced Institute of Science and Technology, Samsung Electronics Co., Ltd., pp. 1-10.
Vaibhao Vikas Tatte, "Shared Memory Based Communication Between Collocated Virtual Machines," MTP Stage 1 Report, Department of Computer Science and Engineering Indian Instituted of Technology, Bombay Mumbai, 2010, 24 pages.

*Primary Examiner* — Matthew Bradley
(74) *Attorney, Agent, or Firm* — Cantor Colburn LLP (57) ABSTRACT

A method used by a virtual machine in communication with an external machine includes providing a single sharing page that is shared between a plurality of virtual machines and a particular virtual machine, wherein the particular virtual machine and the plurality of virtual machines run on a same physical machine; writing into the single sharing page a data packet to be sent by the virtual machine to the external machine; scheduling a page swap between the single sharing page and a blank memory page of the particular virtual machine; and sending, to the external machine, the data packet in the memory page of the particular virtual machine subsequent to the page swap.

20 Claims, 7 Drawing Sheets

TECHNIQUES USED BY A VIRTUAL MACHINE IN COMMUNICATION WITH AN EXTERNAL MACHINE AND RELATED VIRTUAL MACHINE SYSTEM

PRIORITY

This application claims priority to Chinese Patent Application No. 201210016848.4, filed 18 Jan. 2012, and all the benefits accruing therefrom under 35 U.S.C. §119, the contents of which in its entirety are herein incorporated by reference.

BACKGROUND

Embodiments of the present invention relate to the field of virtual machines, and particularly, embodiments of the present invention relate to a method and device used by a virtual machine in communication with an external machine as well as a related virtual machine system.

A virtual machine is a complete computer system that is simulated through software, has complete hardware system functions, and runs in a complete isolated environment. Through virtual machine software, one or more virtual machines can be simulated on a single physical computer (hereinafter briefly referred to as a physical machine). These virtual machines work completely like real computers. For example, a user may install an operating system, install applications, access network resources, and talk by utilizing instant messaging software installed thereon, etc. From the perspective of the user, the virtual machine is only an application that runs on the physical machine; but for the applications running in the virtual machine, it is a real computer.

As mentioned above, the user may perform network communications with other physical machines or virtual machines on the network by utilizing an application running in the virtual machine (for example, a web browser, instant messaging software, etc.). It should be noted that when performing network communications in a common virtualized implementation (for example, an Xen-based virtualized system), only one particular virtual machine (for example, Dom0) among a plurality of virtual machines can directly interact with a network card in a bottom-layer hardware platform of the physical machine. Therefore, in order to perform network communications via the network card, a virtual machine must send, to the particular virtual machine, a data packet that is to be sent to an external machine (which may be a physical machine or a virtual machine) on the network. The data packet is then sent to the external machine from the particular virtual machine.

SUMMARY

In one embodiment, a method used by a virtual machine in communication with an external machine includes providing a single sharing page that is shared between a plurality of virtual machines and a particular virtual machine, wherein the particular virtual machine and the plurality of virtual machines run on a same physical machine; writing into the single sharing page a data packet to be sent by the virtual machine to the external machine; scheduling a page swap between the single sharing page and a blank memory page of the particular virtual machine; and sending, to the external machine, the data packet in the memory page of the particular virtual machine subsequent to the page swap.

In another embodiment, a device used by a virtual machine in communication with an external machine includes providing means configured to provide a single sharing page that is shared between a plurality of virtual machines and a particular virtual machine, wherein the particular virtual machine and the plurality of virtual machines run on a same physical machine; writing means configured to write into the single sharing page a data packet to be sent by the virtual machine to the external machine; scheduling means configured to schedule a page swap between the single sharing page and a blank memory page of the particular virtual machine; and sending means configured to send, to the external machine, the data packet in the memory page of the particular virtual machine subsequent to the page swap.

In another embodiment, a virtual machine system includes a virtual machine hypervisor having a single sharing page for sharing between a plurality of virtual machines and a particular virtual machine, both of which are comprised in the virtual machine system, wherein the particular virtual machine and the plurality of virtual machines run on a same physical machine; the plurality of virtual machines configured to write into the single sharing page data packets to be sent to an external machine; wherein the virtual machine hypervisor further comprises a communication scheduler configured to schedule a page swap between the single sharing page and a blank memory page of the particular virtual machine, such that the data packet in the memory page of the particular virtual machine subsequent to the page swap is sent to the external machine.

BRIEF DESCRIPTION OF THE SEVERAL VIEWS OF THE DRAWINGS

Through reading the following detailed description with reference to the accompanying drawings, the above and other objective, features and advantages of the exemplary embodiments of the present invention will become more comprehensible. In the drawings, a plurality of embodiments of the present invention will be illustrated in an exemplary and non-limiting manner, wherein.

In the drawings, like or corresponding numerical signs indicate the same or corresponding parts.

DETAILED DESCRIPTION

The inventors find that for each virtual machine, an existing virtual machine system always maintains an individual sharing page that is shared between respective virtual machines and the particular virtual machine when performing network communications (i.e., communicating with an external machine). Then, in the case where the virtual machine system comprises multiple virtual machines, there will be a plurality of individual sharing pages between the particular virtual machine and each virtual machine. Each virtual machine writes into a corresponding sharing page the data packet to be sent to an external machine. Then, a page swap is scheduled between the sharing page and a blank memory page of the particular virtual machine. Thus, the data packet to be sent by a virtual machine to an external machine is first sent to the particular virtual machine that may communicate with the external machine to thereby realize network communications.

However, for an application whose data packets sent and received comprise relatively small data packets, while a great repetition in contents and a higher sending frequency (for example, an instant messaging software), this mechanism will incur a dramatic system resources waste. For example, page swaps need to be frequently called regarding such data packets.

Further, an existing network communication needs encapsulating and de-encapsulating data packets in accordance with a particular communication protocol (for example, Ethernet protocol, etc.). Therefore, the existing virtual machine system will copy into an operating system memory space of the virtual machine a data packet that is to be sent to the external machine and received therefrom, so as to encapsulate and de-encapsulate the data packet via various kinds of network protocol stacks.

The inventors find that as far as the above data packet is concerned, it will likewise waste system resources, because it needs frequently copying data packets between different memory spaces. In addition, because what are stored in the sharing page are encapsulated complete data packets, while these data packages are very likely, for example, sent to the same external machine (for example, when chatting with somebody), the sharing page space will be greatly wasted due to repetitive data headers comprised in the encapsulated data packets stored in the sharing page.

Therefore, an objective of the exemplary embodiments of the present invention lies in providing a method and device used by a virtual machine in communication with an external machine as well as a related virtual machine system.

Specifically, a method used by a virtual machine in communication with an external machine according to a first aspect of the present invention, for example, may comprise: providing a single sharing page that is shared between a plurality of virtual machines and a particular virtual machine, wherein the particular virtual machine and the plurality of virtual machines run on a same physical machine; writing into the single sharing page a data packet to be sent by the virtual machine to the external machine; scheduling a page swap between the single sharing page and a blank memory page of the particular virtual machine; and sending, to the external machine, the data packet in the memory page of the particular virtual machine subsequent to the page swap.

A device used by a virtual machine in communication with an external machine according to a second aspect of the present invention, for example, may comprise: providing means configured to provide a single sharing page that is shared between a plurality of virtual machines and a particular virtual machine, wherein the particular virtual machine and the plurality of virtual machines run on a same physical machine; writing means configured to write into the single sharing page a data packet to be sent by the virtual machine to the external machine; scheduling means configured to schedule a page swap between the single sharing page and a blank memory page of the particular virtual machine; and sending means configured to send, to the external machine, the data packet in the memory page of the particular virtual machine subsequent to the page swap.

A virtual machine system according to a third aspect of the present invention, for example, may comprise: a virtual machine hypervisor having a single sharing page for sharing between a plurality of virtual machines and a particular virtual machine, both of which are comprised in the virtual machine system, wherein the particular virtual machine and the plurality of virtual machines run on a same physical machine; the plurality of virtual machines configured to write into the single sharing page data packets to be sent to an external machine; wherein the virtual machine hypervisor further comprises a communication scheduler configured to schedule a page swap between the single sharing page and a blank memory page of the particular virtual machine, such that the data packet in the memory page of the particular virtual machine subsequent to the page swap is sent to the external machine.

According to the technical solutions of the present invention, by providing a single sharing page that is shared between a plurality of virtual machines and a particular virtual machine, writing into the single sharing page data packets to be sent by the virtual machines to an external machine, and scheduling a page swap between the single sharing page and a blank memory page of the particular virtual machine, the times and frequency of page swap may be reduced, thereby saving system resources.

Further, according to technical solutions of the present invention embodiments, by prior to writing into the single sharing page data packets to be sent by the virtual machines to the external machine, encapsulating the data packets in the user memory space of the virtual machine according to a particular protocol, and by directly writing the encapsulated data packet into the single sharing page by a method call, instead of encapsulating the data packets through a network protocol stack as in the prior art, the times of copying data packets from the user memory space to the operating system memory space is reduced, thereby saving system resources.

Still further, according to technical solutions of the present invention embodiments, by reorganizing data packets to be sent to the external machine in the single sharing page, the memory resources of the sharing page may be saved.

Hereinafter, the principle and spirit of the present invention will be described with reference to various exemplary embodiments. It should be understood that provision of these embodiments is only to enable those skilled in the art to better understand and further implement the present invention, not intended for limiting the scope of the present invention in any manner.

In one embodiment, a single sharing page for sending data packets to an external machine is provided for being shared between a plurality of virtual machines and a particular virtual machine; wherein, the particular virtual machine and the plurality of virtual machines run on a same physical machine. Then, a page swap is scheduled between the single sharing page and a blank memory page of the particular virtual machine, and data packets in the memory page of the particular virtual machine subsequent to the page swap are sent to an external machine. In this way, system resources are saved and the efficiency is enhanced.

Here, it should be understood that the involved "external machine" may be another physical machine that is connected to the present physical machine on the network or a virtual machine running on the another physical machine; "a single sharing page" denotes a memory page available for virtual machines to write the data packets to be sent to an external machine; and as above mentioned, "a particular virtual machine" may be a virtual machine that directly interacts with a network card in the bottom-layer hardware platform of a physical machine; for example, Dom0 in an Xen-based virtual system is just the "particular virtual machine" indicated herein, and of course, the present invention is not limited thereto. Besides, any arbitrary number of elements in the drawings is merely for exemplary, not for restrictive purposes, and any naming is merely for distinguishing, without any restriction meaning.

Hereinafter, with reference to FIG. 1, there is described a block diagram of a virtual machine system 10 according to an exemplary embodiment of the present invention. In this figure, solid-line connections between components represent data flows, while dotted-line connections represent event flows.

Figure 1:
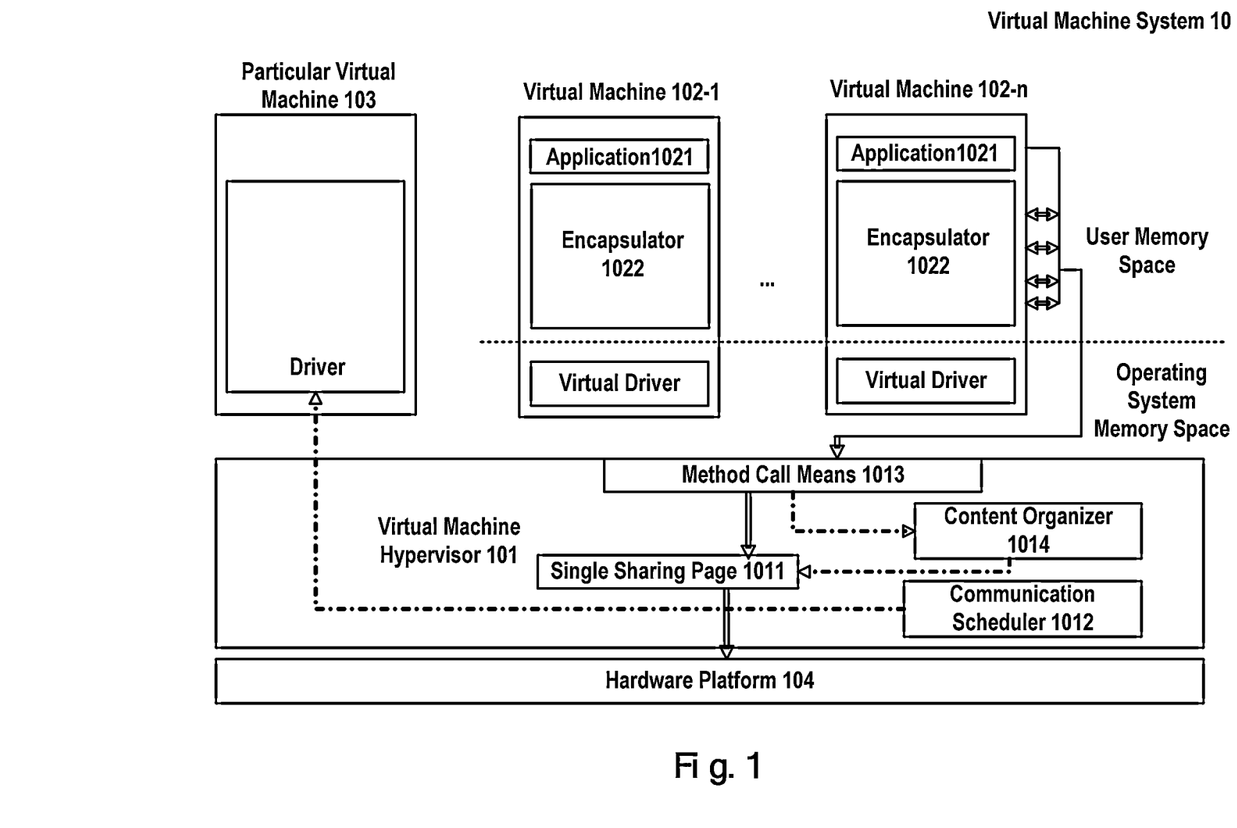
FIG. 1 schematically illustrates a block diagram of a virtual machine system according to an exemplary embodiment of the present invention.

As illustrated in FIG. 1, the virtual machine system 10, for example, may comprise: a virtual machine hypervisor 101 having a single sharing page 1011 that is shared between a plurality of virtual machines (102-1 through 102-n, which are generally referred to as 102 hereinafter) and a particular virtual machine 103, both of which are comprised in the virtual machine system 10, wherein the particular virtual machine 103 and the plurality of virtual machines 102 run on a same physical machine (i.e., hardware platform 104); the plurality of virtual machines 102 configured to write into the single sharing page 1011 data packets to be sent to an external machine (not shown); wherein the virtual machine hypervisor 101, for example, further comprises a communication scheduler 1012 configured to schedule a page swap between the single sharing page 1011 and a blank memory page (not shown) of the particular virtual machine 103, such that data packets in the memory page of the particular virtual machine 103 subsequent to the page swap are sent to the external machine (which will be detailed hereinafter).

According to some embodiments of the present invention, the virtual machine system 10 may, for example, further comprise an encapsulator 1022, which, for example, may be disposed in each virtual machine 102 or may be a component independent of other components, the encapsulator 1022 is configured to: prior to writing into the single sharing page 1011 a data packet that is to be sent by a corresponding virtual machine (for example, virtual machine 102-n) among the plurality of virtual machines to an external machine, encapsulate the data packet according to a particular protocol (for example, Ethernet protocol) in a user memory space (the part above the dotted line that separates the user memory space and an operating system memory space as illustrated in FIG. 1).

Those skilled in the art would also appreciate that the encapsulator 1022 may be further used to de-encapsulate such an encapsulated data packet after receiving the data packet.

According to some embodiments of the present invention, encapsulating a data packet comprises, for example, adding various kinds of headers and associated fields thereto. Various kinds of headers, for example, may comprise an application-layer header, a transmission-layer header, a network-layer header, and a data link-layer header, etc. These headers may be simple general protocol headers, which may be defined by for example, a system administrator, when implementing embodiments of the present invention.

According to some embodiments of the present invention, the virtual machine hypervisor 101 may, for example, further comprise a method call means 1013 that is configured to directly write an encapsulated data packet into a single sharing page 1011 by a method call.

For example, in a Xen-based virtual machine system, the method call according to an embodiment of the present invention may be implemented by utilizing a Hypercall function in the Xen-based virtual machine system.

As known by those skilled in the art, a Hypercall is to a syscall what a hypervisor is to an operating system. Alternatively, a Hypercall is to a virtual machine hypervisor what a syscall is to a kernel. A Hypercall is a software trap from a virtual machine to the virtual machine hypervisor, just as a syscall is a software trap from an application to the kernel. Virtual machines will use Hypercalls to request privileged operations like updating pagetables. Like a syscall, the Hypercall is synchronous, but the return path from the virtual machine hypervisor to the virtual machine uses event channels. An event channel is a queue of asynchronous notifications, and notifies of the same sorts of events that interrupts notify on native hardware. When a virtual machine with pending events in its queue is scheduled, the operating system's event-callback handler is called to take appropriate action.

Those skilled in the art would appreciate that, here, the embodiments of the present invention are only described with the Hypercall in the Xen-based virtual machine system as an example. However, the present invention is not limited thereto. In various kinds of virtual machine systems, any existing or user-customized application programming interface (API) that is capable of performing system call may be used for implementing the present invention.

According to some embodiments of the present invention, the virtual machine hypervisor 101, for example, may optionally further comprise a content organizer 1014 that is configured to reorganize data packets to be sent to the external machine in the single sharing page 1011 (which will be detailed hereinafter).

According to some embodiments of the present invention, the content organizer 1014, for example, may be further configured to aggregate, into one data packet, payloads of the data packets with a same destination address (for example, going to the same external machine) and a same protocol-layer type (for example, Ethernet) from the same virtual machine (for example, virtual machine 102-n) or from different virtual machines (for example, from virtual machine 102-1 and 102-n, respectively) running on a same physical machine, so as to reorganize the data packets.

Hereinafter, with reference to FIG. 2 and in conjunction with FIG. 1, there is described a flow chart of a method 200 used by a virtual machine (e.g., virtual machine 102-n as illustrated in FIG. 1) in communication with an external machine according to an exemplary embodiment of the present invention.

Figure 2:
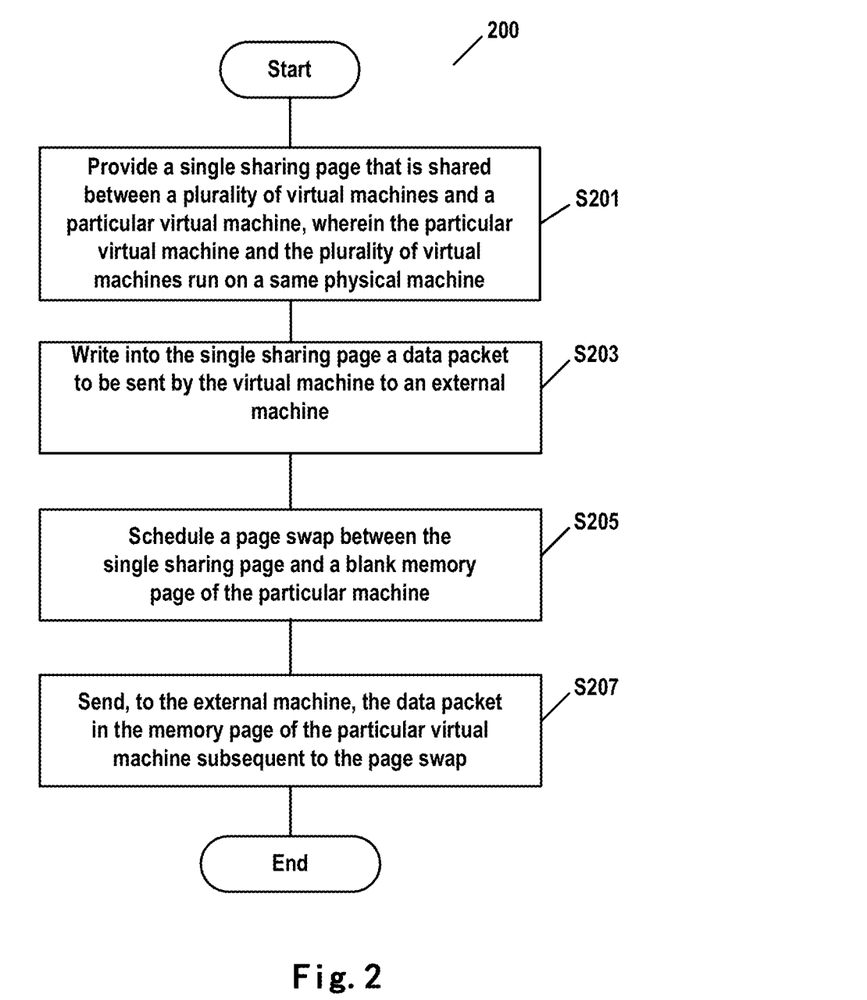
FIG. 2 schematically illustrates a flow chart of a method used by a virtual machine in communication with an external machine according to an exemplary embodiment of the present invention.

As illustrated in FIG. 2, the method 200 may, for example, comprise providing a single sharing page (for example, the single sharing page 1011 as illustrated in FIG. 1) that is shared between a plurality of virtual machines (for example, the virtual machines 102 as illustrated in FIG. 1) and a particular virtual machine (for example, the virtual machine 103 as illustrated in FIG. 1), wherein the particular virtual machine 103 and the plurality of virtual machines 102 run on a same physical machine (for example, the hardware platform 104 as illustrated in FIG. 1) (operation S201).

Next, the method 200, for example, may comprise writing into a single sharing page (for example, the single sharing page 1011 as illustrated in FIG. 1) a data packet to be sent by the virtual machine (for example, virtual machine 102-*n* as illustrated in FIG. 1) to an external machine (operation S203).

Further, the method 200, for example, may comprise scheduling a page swap between the single sharing page (for example, the single sharing page 1011 as illustrated in FIG. 1) and a blank memory page of the particular virtual machine (for example, the virtual machine 103 as illustrated in FIG. 1) (operation S205).

Finally, the method 200, for example, may comprise sending, to the external machine, the data packet in the memory page of the particular virtual machine (for example, the virtual machine 103 as illustrated in FIG. 1) subsequent to the page swap (operation S207).

Next, with reference to FIG. 3 and in conjunction with FIG. 1 and FIG. 4, additional preferred operations of the method 200 according to some embodiments of the present invention will be described.

It should be noted that the operations identical to the prior art are only described in brief, for purposes of completeness. To differentiate, the phrase "according to some embodiments of the present invention" is placed before the steps being as the additional preferred operations to the method used by a virtual machine in communication with an external machine as illustrated in FIG. 2.

Figure 3:
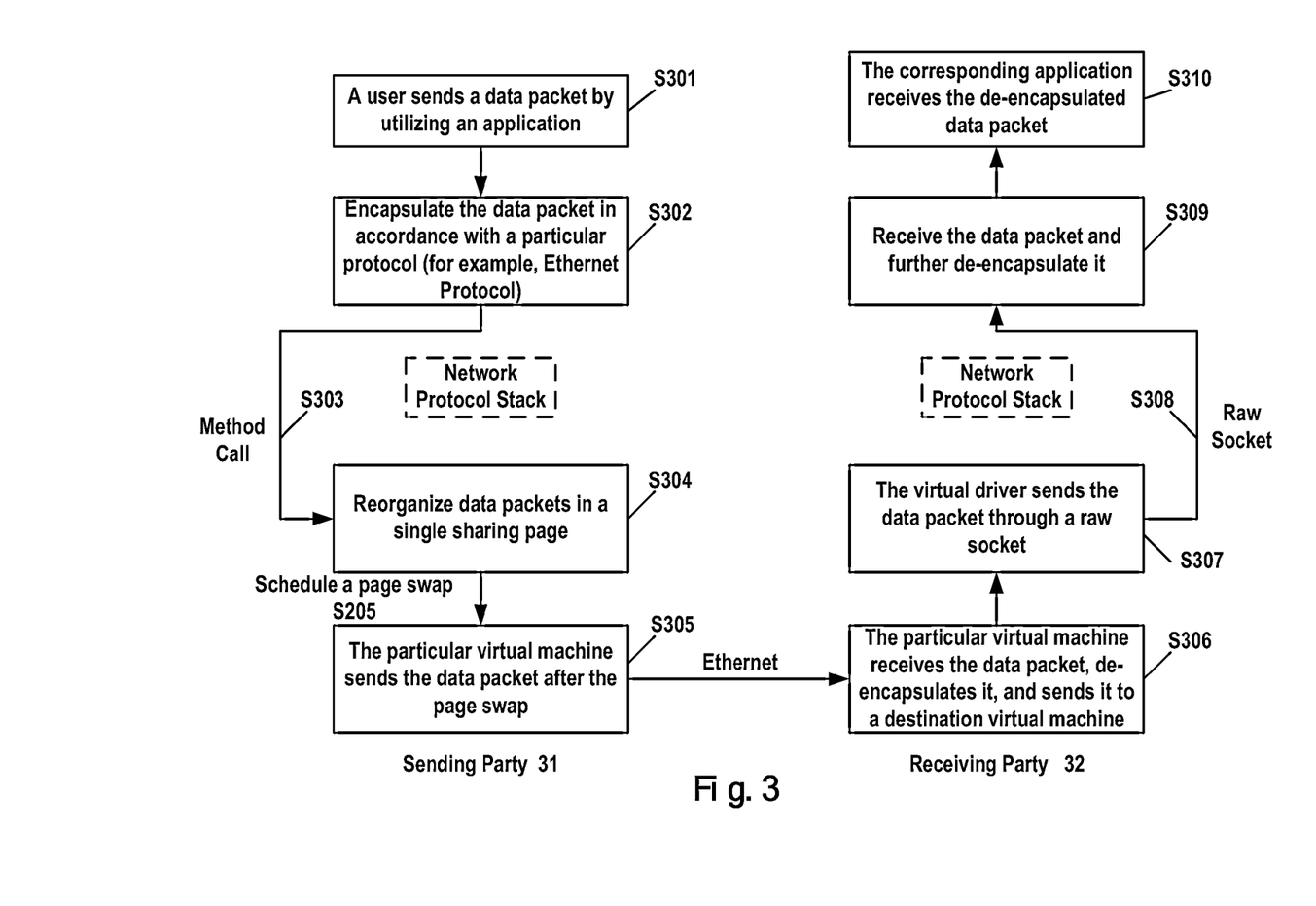
FIG. 3 schematically further illustrates a flow chart of a method used by a virtual machine in communication with an external machine according to an exemplary embodiment of the present invention.

As illustrated in FIG. 3, at operation S301, a user of a virtual machine of a sending party 31 (for example, the virtual machine 102-*n* as illustrated in FIG. 1) utilizes an application (for example, QQ, etc.) to send a data packet.

Next, according to some embodiments of the present invention, at operation S302, prior to writing into a single sharing page (for example, the single sharing page 1011 as illustrated in FIG. 1) a data packet to be sent by a virtual machine (for example, the virtual machine 102-*n* as illustrated in FIG. 1) to the external machine, the data packet is encapsulated in a user memory space of the virtual machine (for example, the virtual machine 102-*n* as illustrated in FIG. 1) according to a particular protocol (for example, the Ethernet protocol).

According to some embodiments of the present invention, this operation may, for example, be implemented by the encapsulator 1022 as illustrated in FIG. 1.

In this case, it should be understood that, for example, the encapsulator 1022 as illustrated in FIG. 1 may encapsulate a data packet to be sent over the network according to a protocol used by network communications, without copying it from the user memory space to an operating system memory space for the purpose of encapsulating the data packet via a network protocol stack. The reason for this practice is that by encapsulating the data packet utilizing a simple general protocol header (which may be defined by for example the system administrator when implementing the embodiments of the present invention), such that from the perspective of other devices connected to the network, the encapsulated data packet is a data packet that conforms to a certain protocol, and the external machine that receives the data packet may then de-encapsulate it to obtain the payload, thereby fulfilling the purpose of communication. An advantage of this practice is to save the operation of having to copy the data packet to the operating system memory space so as to encapsulate the data packet via a network protocol stack, thus saving system resources.

Further, according to some embodiments of the present invention, at operation S303, the encapsulated data packet is directly written into the single sharing page (for example, the single sharing page 1011 as illustrated in FIG. 1) by a method call (for example, the operation is identical to that performed by the method call means 1013 as illustrated in FIG. 1). Those skilled in the art would appreciate that operation S303 may be an embodiment of the writing operation S203 as illustrated in FIG. 2.

Further, according to some embodiments of the present invention, at operation S304, the data packets to be sent to the external machine are reorganized in the single sharing page (for example, the single sharing page 1011 as illustrated in FIG. 1).

Specifically, the reorganization may be performed by aggregating, into one data packet, the payloads of the data packets with the same destination address and protocol-layer type from a same virtual machine or from different virtual machines running on a same physical machine.

Figure 4:
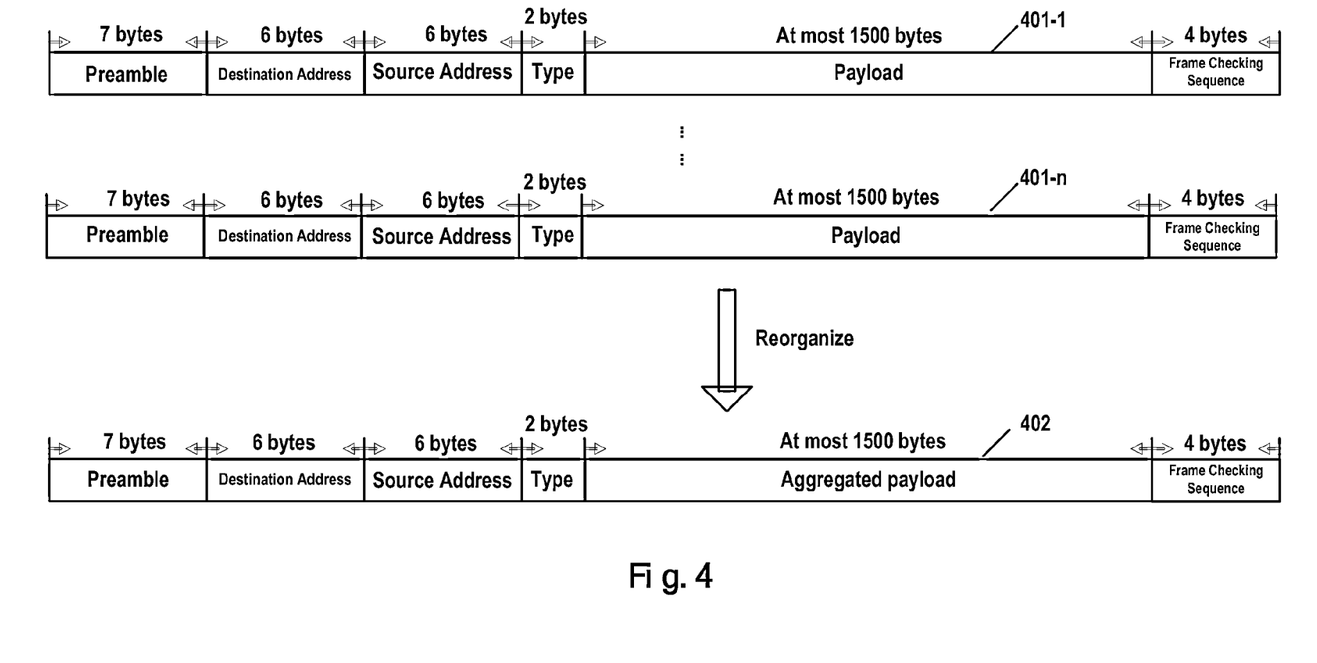
FIG. 4 schematically illustrates a diagram of reorganizing data packets in a single sharing page according to an exemplary embodiment of the present invention.

For example, suppose as illustrated in FIG. 4, various data packets containing payloads 401-1 and 401-*n* come from a same virtual machine (for example, the virtual machine 102-*n* as illustrated in FIG. 1) or from different virtual machines (for example, virtual machines 102-1 to 102-*n* as illustrated in FIG. 1) running on the same physical machine (for example, the hardware platform 104 as illustrated in FIG. 1), and they have the same destination address and protocol-layer type (for example, Ethernet protocol). The payloads 401-401*n* of the various data packets may be aggregated, as aggregated payload 402, into one data packet as illustrated in FIG. 4.

From FIG. 4, it may be intuitively understood that by only reserving one instance of a plurality of identical data headers, the memory space of the single sharing page is saved, thereby saving the memory space of the memory page of the particular virtual machine, such that more effective data may be stored in a same memory space.

Returning to FIG. 3, further, after operation S205 (namely, scheduling page swap, which will be detailed hereinafter) as illustrated in FIG. 2, at operation S305, the particular virtual machine (for example, the particular virtual machine 103 as illustrated in FIG. 3) sends the packet to a receiving party 32 via the Ethernet (which is only exemplary, and other networks may also be employed; the present invention has no limitation thereto).

Further, at operation S306, a particular virtual machine at the receiving party 32 receives the data packet, and after de-encapsulating it, sends the de-encapsulated data packet to its given destination virtual machine.

Next, according to some embodiments of the present invention, a virtual driver of the destination virtual machine forwards the data packet (for example, going to the encapsulator 1022 as illustrated in FIG. 1) through a raw socket (operations S307 and S308) so as to de-encapsulate it (operation S309), such that at operation S310, the corresponding application (for example, QQ, etc.) obtains the de-encapsulated data packet.

Those skilled in the art would appreciate that if the data packet sent from the sending party 31 has neither been encapsulated in the user memory space nor reorganized in a single sharing page, but sent after being encapsulated according to the prior art, then operation S308 at the receiving party 32 will not be correspondingly performed; instead, like the prior art, the data packet is sent to the corresponding application after being de-encapsulated via a network protocol stack.

Figure 5:
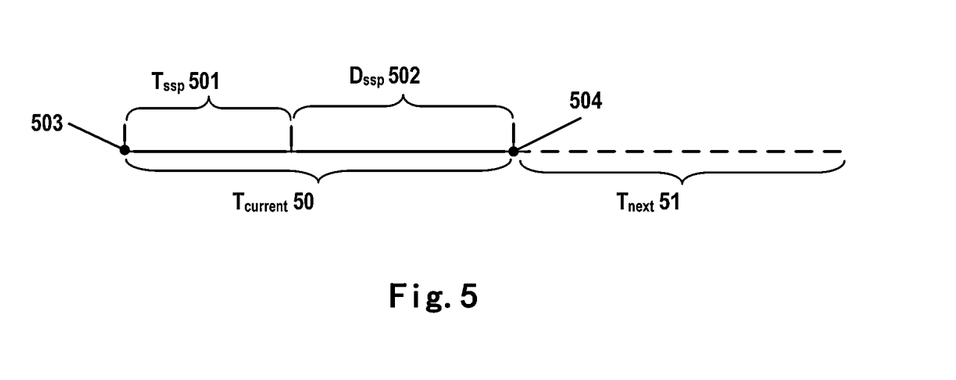
FIG. 5 schematically illustrates a diagram of a page swap cycle according to an exemplary embodiment of the present invention.

Next, an exemplary page swap scheduling algorithm will be further described with reference to FIG. 5. In FIG. 5, reference numeral 50, for example, represents a current cycle $T_{current}$, and reference numeral 51 represents the next cycle $T_{next}$. The time point 503 represents the start time of the current cycle $T_{current}$ 50, and the time point 504 represents the start time of the next cycle $T_{next}$ 51. It should be noted that the page swap scheduling algorithm provided here is only for illustrating the present invention, not for limiting it and any existing, currently being developed, and to be developed in the future, scheduling algorithm (for example, various time-based or space-based scheduling algorithms) in the art may be used for implementing the present invention.

According to some embodiments of the present invention, for example, the page swap may be scheduled in response to satisfying a condition for triggering the page swap. Specifically, according to some embodiments of the present invention, for example, in response to a certain percentage (for example, 90%) of data packets having been written into a single sharing page, the page swap between the single sharing page and the blank memory page of the particular virtual machine is scheduled.

According to some embodiments of the present invention, for example, in response to arrival at a start time of a page swap cycle (for example, illustrated by the time points 503 and 504 as illustrated in FIG. 5, which means the cycle for preceding single sharing page writing already ends), a page swap between the single sharing page and the blank memory page of the particular virtual machine is scheduled.

According to some embodiments of the present invention, for example, in response to the arrival at the start time of the page swap cycle and further determining that the single sharing page includes a data packet(s) that is to be sent to the external machine, the page swap between the single sharing page and the blank memory page of the particular virtual machine is scheduled. Otherwise, the page swap is not scheduled. Moreover, this case would likely indicate that the page scheduling cycle has been set too short, such that the virtual machine has no enough time to write data packets into the single sharing page; thus, it needs recalculating the page scheduling cycle.

Those skilled in the art would appreciate that alternatively, a timer may be set, such that upon expiration of the predetermine period of the timer, the page scheduling cycle is re-calculated so as to avoid blind recalculation. Those skilled in the art would also appreciate that in the case of introducing the mechanism of recalculating the page scheduling cycle, the page scheduling cycle may be dynamically varied.

According to some embodiments of the present invention, for example, the page swap between the single sharing page and the blank memory page of the particular virtual machine may be scheduled in response to arrival at the fixed time (for example, 500 ms), namely, a static page swap cycle.

According to some embodiments of the present invention, if any one of the each virtual machine, for writing into the single sharing page its data packet to be sent to the external machine, needs a time interval that spans across the start time of the next page swap cycle (for example, suppose spanning across the start time of the next cycle $T_{next}$ 51 in FIG. 5, as illustrated by time point 504), the writing by the virtual machine may be postponed to the next page swap cycle (i.e., postponed to the cycle $T_{next}$ 51 whose start time is indicated by the time point 504 in FIG. 5). This is implemented by suspending the writing operation of the current virtual machine, while scheduling the writing from another virtual machine (if existing) that has a data packet to be sent and the time interval needed by which will not span across the start time of the next page swap cycle when scheduling the writing from each virtual machine to the single sharing page. The advantage of such practice lies in the capability of avoiding the scenario where the operation of writing data into the single sharing page by a certain virtual machine is interrupted and then the data packet written into the single sharing page would be discontinuous.

Next, further referring to FIG. 5, an exemplary calculating method for the page swap cycle will be described. Those skilled in the art would appreciate that the calculating method is merely for illustrating the embodiments of the present invention, and the present invention is not limited thereto; any calculating method that may use $T_{ssp}$ 501 and $D_{ssp}$ 502 to obtain $T_{current}$ 50 may be used for implementing the present invention.

With the cycle $T_{current}$ 50 in FIG. 5 as an example, it is determined based on an average time interval for all virtual machines on a same physical machine having data packets to send to the external machine (for example, indicated by the reference numeral $T_{ssp}$ 501 as illustrated in FIG. 5) and an average time interval required by all virtual machines to write data packets into the single sharing page (for example, indicated by the reference numeral $D_{ssp}$ 502 as illustrated in FIG. 5). According to some embodiments of the present invention, as illustrated in FIG. 5, it may be determined by the sum of the two, i.e., $T_{ssp}$ 501+$D_{ssp}$ 502=$T_{current}$ 50. It should be noted that this calculating method is only exemplary, and the present invention is not limited thereto.

For example, according to some embodiments of the present invention, a weighted sum of the two may be calculated, for example, $a*T_{ssp}$ 501+$b*D_{ssp}$ 502=$T_{current}$ 50. Here, a and b are weights, and their physical meanings may be estimated errors of calculated average time intervals $T_{ssp}$ 501 and $D_{ssp}$ 502 with respect to effective real values, respectively. For example, according to an empirical value, the effective real value of $T_{ssp}$ 501 is for example 11 ms, while the actually calculated average time interval $T_{ssp}$ 501 is 10 ms, then a will be selected to be 1.1. It should be noted that these numerical values are only exemplary, and the present invention is not limited thereto.

According to some embodiments of the present invention, $T_{ssp}$ 501=$\Sigma_{i=1}^{n} T_i$, where i=1 ... n, n denotes the number of all virtual machines on a same physical machine, and $T_i$ denotes the average time interval for each virtual machine having data packets to send to the external machine.

Likewise, $D_{ssp}$ 502=$\Sigma_{i=1}^{n} D_i$, where i=1 ... n, n denotes the number of all virtual machines on a same physical machine, and $D_i$ denotes the average time interval required for each virtual machine to write data packets into the single sharing page.

According to some embodiments of the present invention, the method 200 used by a virtual machine in communication with an external machine as illustrated in FIG. 2 may, for example, further comprise notifying a page swap cycle to each virtual machine.

Those skilled in the art would appreciate that the above scheduling of page swap and scheduling of the writing of data packets from each virtual machine to the single sharing page may be performed by the communication scheduler 1012 as illustrated in FIG. 1.

Figure 6:
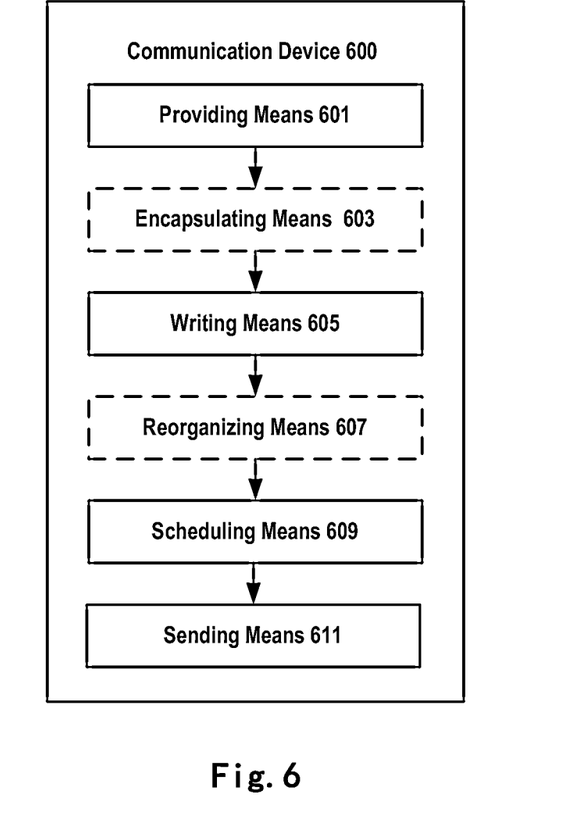
FIG. 6 schematically illustrates a block diagram of a device used by a virtual machine in communication with an external machine according to an exemplary embodiment of the present invention.

Hereinafter, a block diagram of device 600 used by a virtual machine in communication with an external machine (hereinafter referred to as the communication device 600) according to exemplary an embodiment of the present invention will be described with reference to FIG. 6. As illustrated in FIG. 6, the communication device 600, for example, may comprise: a providing means 601 configured to provide a single sharing page that is shared between a plurality of the virtual machines and a particular virtual machine, wherein the particular virtual machine and the plurality of the virtual machines run on a same physical machine; a writing means 605 configured to write into the single sharing page data packets to be sent by the virtual machines to the external machine; a scheduling means 609 configured to schedule a page swap between the single sharing page and a blank memory page of the particular virtual machine; and a sending means 611 configured to send, to the external machine, the data packets in the memory page of the particular machine subsequent to the page swap.

According to some embodiments of the present invention, the communication device 600, for example, may further comprise: an encapsulating means 603 configured to, prior to writing into the single sharing page the data packet to be sent by the virtual machine to the external machine, encapsulate the data packet in a user memory space of the virtual machine according to a particular protocol; and the writing means 605, for example, may comprise means for directly writing the encapsulated data packet into the single sharing page by a method call.

According to some embodiments of the present invention, the scheduling means 609, for example, may operate in response to arrival at the start time of the page swap cycle.

According to some embodiments of the present invention, the page swap cycle, for example, may be determined based on an average time interval for all virtual machines on a same physical machine having data packets to send to the external machine and an average time interval required by all virtual machines to write the data packets into the single sharing page.

According to some embodiments of the present invention, the communication device 600, for example, may further comprise: a notifying means (not shown) configured to notify each virtual machine of the page swap cycle.

According to some embodiments of the present invention, the scheduling means 609, for example, operates in response to further determination that the single sharing page includes a data packet to be sent to the external machine.

According to some embodiments of the present invention, the communication device 600, for example, may further comprise: a computing means (not shown) configured to re-compute the page swap cycle in response to determining that the single sharing page includes no data packet to be sent to the external machine.

According to some embodiments of the present invention, the communication device 600, for example, may comprise: a postponing means (not shown) configured to postpone the writing by any one of each virtual machine to a next page swap cycle, if the virtual machine, for writing into the single sharing page its data packet to be sent to the external machine, needs a time interval that spans across the start time of the next page swap cycle.

According to some embodiments of the present invention, the communication device 600, for example, may further comprise: a reorganizing means 607 configured to reorganize the data packet to be sent to the external machine in the single sharing page.

According to some embodiments of the present invention, the reorganizing means 607, for example, may comprise means configured to aggregate, into one data packet, payloads of the data packets with a same destination address and a same protocol-layer type from a same virtual machine or from different virtual machines running on a same physical machine.

According to some embodiments of the present invention, the communication device 600, for example, may further comprise a distributing means (not shown) configured to, in response to the particular virtual machine receiving a data packet from an external machine, use a raw socket to forward the data packet from a virtual driver of a virtual machine that is addressed in the data packet so as to de-encapsulate the data packet, wherein the data packet from the external machine is a data packet that has been encapsulated in a user memory space of a virtual machine of the external machine according to a particular protocol or that has been reorganized in a single sharing page of the external machine.

Figure 7:
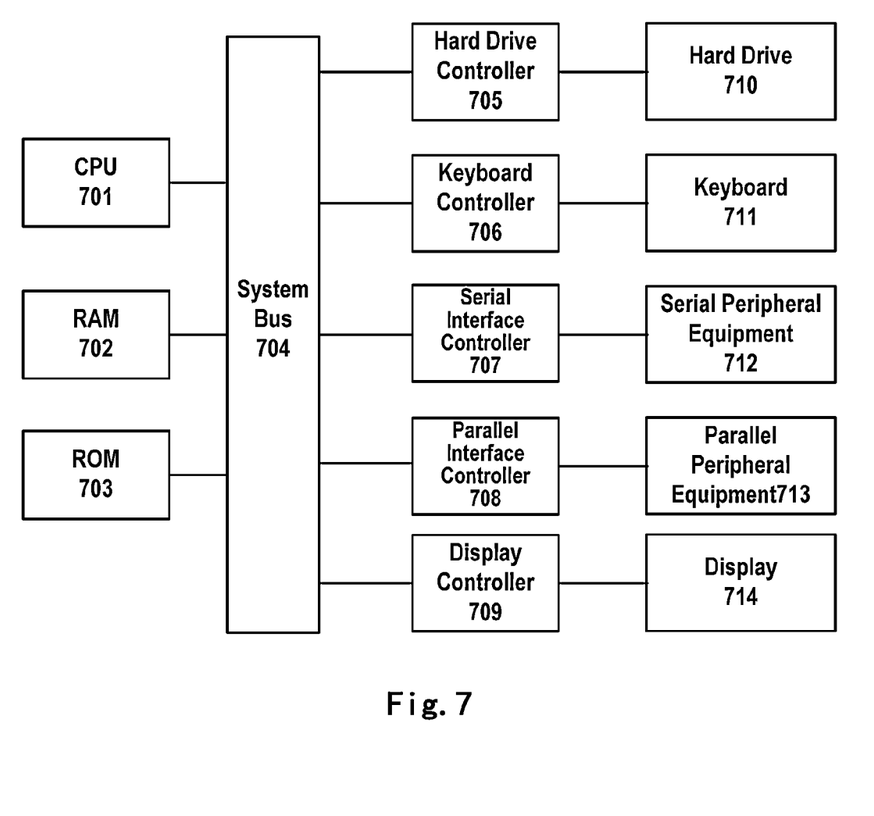
FIG. 7 schematically illustrates a structural block diagram of a computer device capable of implementing embodiments of the present invention.

Hereinafter, a computing device capable of implementing the present invention will be described with reference to FIG. 7. FIG. 7 shows a structural block diagram of a computing device which is applicable to implement the embodiments of the present invention.

As shown in FIG. 7, the computing device may include: a CPU (Central Process Unit) 701, a RAM (Random Access Memory) 702, a ROM (Read Only Memory) 703, a system bus 704, a hard drive controller 705, a keyboard controller 706, a serial interface controller 707, a parallel interface controller 708, a display controller 709, a hard drive 710, a keyboard 711, a serial peripheral equipment 712, a parallel peripheral equipment 713 and a display 714. Among above devices, the CPU 701, the RAM 702, the ROM 703, the hard drive controller 705, the keyboard controller 706, the serial interface controller 707, the parallel controller 708 and the display controller 709 are coupled to the system bus 704. The hard drive 710 is coupled to the hard drive controller 705. The keyboard 711 is coupled to the keyboard controller 706. The serial peripheral device 712 is coupled to the serial interface controller 707. The parallel peripheral device 713 is coupled to the parallel interface controller 708. And, the display 714 is coupled to the display controller 709. It should be understood that the structure as shown in FIG. 7 is only for exemplary purpose rather than any limitation to the present invention. In some cases, some devices can be added or reduced as based on specific situations.

After describing the technical solutions of the present invention, a system performance simulation diagram will be described after implementing the embodiments according to the present invention with reference to FIGS. 8A and 8B.

Specifically, through implementing the embodiments of the present invention, the page swap frequency is reduced to $$\frac{vtN-1}{vtN} = 1 - \frac{1}{vtN},$$

where N: the number of virtual machines on a physical machine, v: packet transmission rate of the virtual machine, t: page swap cycle.

It should be understood that the physical meaning of the above equation is that vtN denotes the page switch frequency within t time slot without implementing the embodiments of the present invention, while through implementing the embodiments of the present invention, the page swap frequency is reduced to 1, thus the page swap reduction rate is $$\frac{vtN-1}{vtN} = 1 - \frac{1}{vtN}.$$

It should be understood that if the reorganization operation is not performed on data packets in a single sharing page according to the embodiments of the present invention, then the above equation requires vtN≤p/s (where p: the size of the single sharing page (for example, a memory page); s: size of a data packet), whose physical meaning is that: because vtN number of data packets need to be placed in a single sharing page, its amount cannot exceed the number of data packets that may be put into the single sharing page.

If the reorganization operation is performed on data packets in a single sharing page according to the embodiments of the present invention, then the above equation requires vtN≤p/(s·q) (where q: ratio of the packet content size to the header size), whose physical meaning is identical to the above mentioned, i.e., the number of packets does not exceed the number of data packets that can be placed into the single sharing page.

Figure 8A:
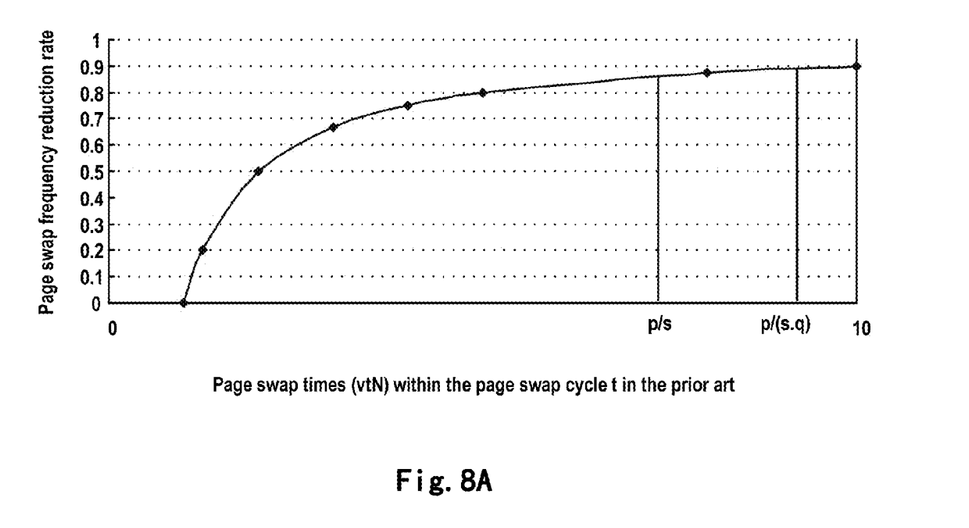
FIGS. 8A and 8B schematically illustrate simulation diagrams of system performance after the embodiments of the present invention are implemented.
Figure 8B:
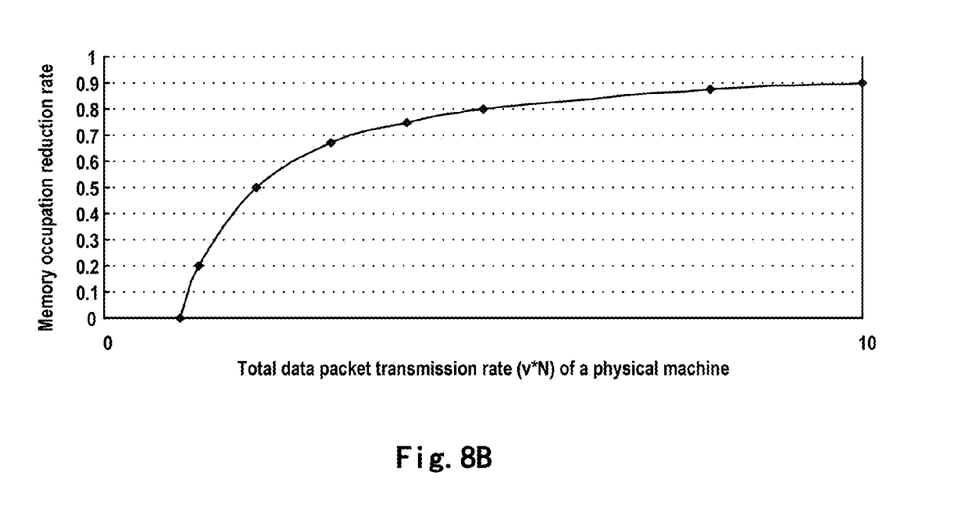

The page swap reduction rate is illustrated in FIG. 8A, where the x axis of the coordinate denotes "the page swap times (vtN) within the page swap cycle t in the prior art," while the y axis denotes "page swap frequency reduction rate."

Further, after implementing the technical solution according to the embodiments of the present invention, the memory occupation reduction rate is 1-1 (vN). This technical effect is illustrated in FIG. 8B, where the x axis of FIG. 8B denotes the total data packet transmission rate (v*N) of a physical machine, and the y axis denotes the memory occupation reduction rate.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer usable program codes embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard drive, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It should also be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present invention has been depicted with reference to a plurality of embodiments, it should be understood that the present invention is not limited to the disclosed embodiments. On the contrary, the present invention intends to cover various modifications and equivalent arrangements included in the spirit and scope of the appended claims. The scope of the appended claims meets the broadest explanations and covers all such modifications and equivalent structures and functions.

The invention claimed is:

1. A method of implementing communication between a virtual machine system and an external machine, the virtual machine system including a plurality of virtual machines, a particular virtual machine and a physical machine, wherein the particular virtual machine and the plurality of virtual machines run on the physical machine, and wherein only the particular virtual machine directly interacts with a network card in a hardware platform of the physical machine, the method comprising:
   providing a single sharing page that is shared between the plurality of virtual machines and the particular virtual machine;
   writing, by a given one of the plurality of virtual machines, a data packet into the single sharing page, wherein the data packet is to be sent to the external machine via the particular virtual machine;
   scheduling a page swap between the single sharing page and a blank memory page of the particular virtual machine; and
   sending, by the particular virtual machine to the external machine via the hardware platform, the data packet contained in the memory page of the particular virtual machine subsequent to the page swap.

2. The method according to claim 1, further comprising:
   prior to the given one of the plurality of virtual machines writing the data packet into the single sharing page, encapsulating the data packet in a user memory space of the given one of the virtual machines according to a particular protocol; and
   directly writing the encapsulated data packet into the single sharing page by a method call.

3. The method according to claim 1, wherein scheduling the page swap occurs in response to arrival at a start time of a page swap cycle, wherein the page swap cycle is determined based on an average time interval for all virtual machines on the same physical machine having data packets to send to the external machine and an average time interval required by all the virtual machines to write the data packets into the single sharing page; and
   wherein the method further comprises: notifying each virtual machine of the page swap cycle.

4. The method according to claim 3, wherein scheduling the page swap occurs in response to further determining that the single sharing page includes a data packet to be sent to the external machine; and
   wherein the method further comprises: re-computing the page swap cycle in response to determining that the single sharing page includes no data packet to be sent to the external machine.

5. The method according to claim 3, further comprising:
   postponing writing by any of the each virtual machine to a next page swap cycle, if the any virtual machine, for writing into the single sharing page its data packets to be sent to the external machine, needs a time interval that spans across the start time of the next page swap cycle.

6. The method according to claim 1, further comprising:
   reorganizing data packets to be sent to the external machine in the single sharing page.

7. The method according to claim 6, wherein the reorganizing comprises:
   aggregating, into one data packet, payloads of the data packets with a same destination address and protocol-layer type from a same virtual machine or from different virtual machines running on the same physical machine.

8. The method according to claim 1, further comprising:
   in response to the particular virtual machine receiving a data packet from an external machine, using a raw socket to forward the data packet from a virtual driver of a virtual machine that is addressed in the data packet so as to de-encapsulate the data packet,
   wherein the data packet from the external machine is a data packet that has been encapsulated in a user memory space of a virtual machine of the external machine according to a particular protocol or that has been reorganized in a single sharing page of the external machine.

9. A processor implemented communication device configured to implement communication between a virtual machine system and an external machine, the virtual machine system including a plurality of virtual machines, a particular virtual machine and a physical machine, wherein the particular virtual machine and the plurality of virtual machines run on the physical machine, and wherein only the particular virtual machine directly interacts with a network card in a hardware platform of the physical machine, the device comprising:
   providing means configured to provide a single sharing page that is shared between the plurality of virtual machines and the particular virtual machine;
   writing means configured to write, by a given one of the plurality of virtual machines, a data packet into the single sharing page, wherein the data packet is to be to the external machine via the particular virtual machine;
   scheduling means configured to schedule a page swap between the single sharing page and a blank memory page of the particular virtual machine; and
   sending means configured to send by the particular virtual machine, to the external machine via the hardware platform, the data packet contained in the memory page of the particular virtual machine subsequent to the page swap.

10. The device according to claim 9, further comprising:
    encapsulating means configured to, prior to the given one of the plurality of virtual machines writing the data packet into the single sharing page, encapsulate the data packet in a user memory space of given one of the virtual machines according to a particular protocol; and
    wherein the writing means comprises: means for directly writing the encapsulated data packet into the single sharing page by a method call.

11. The device according to claim 9, wherein the scheduling means operates in response to arrival at a start time of a page swap cycle, wherein the page swap cycle is determined based on an average time interval for all virtual machines on the same physical machine having data packets to send to the external machine and an average time interval required by all the virtual machines to write the data packets into the single sharing page; and wherein the device further comprises notifying means configured to notify each virtual machine of the page swap cycle.

12. The device according to claim 11, wherein the scheduling means operates in response to further determining that the single sharing page includes a data packet to be sent to the external machine; and wherein the device further comprises: computing means configured to re-compute the page swap cycle in response to determining that the single sharing page includes no data packet to be sent to the external machine.

13. The device according to claim 11, further comprising:

postponing means configured to postpone writing by any of the each virtual machine to a next cycle of the page swap, if the any virtual machine, for writing into the single sharing page its data packets to be sent to the external machine, needs a time interval that spans across the start time of the next page swap cycle.

14. The device according to claim 9, further comprising:

reorganizing means configured to reorganize data packets to be sent to the external machine in the single sharing page.

15. The device according to claim 14, wherein the reorganizing means comprises:

means for aggregating, into one data packet, payloads of the data packets with a same destination address and protocol-layer type from a same virtual machine or from different virtual machines running on the same physical machine.

16. The device according to claim 9, further comprising:

distributing means configured to, in response to the particular virtual machine receiving a data packet from an external machine, use a raw socket to forward the data packet from a virtual driver of a virtual machine that is addressed in the data packet so as to de-encapsulate the data packet, wherein the data packet from the external machine is a data packet that has been encapsulated in a user memory space of a virtual machine of the external machine according to a particular protocol or that has been reorganized in a single sharing page of the external machine.

17. A virtual machine system, comprising:

a plurality of virtual machines, a particular virtual machine and a physical machine, wherein the particular virtual machine and the plurality of virtual machines run on the physical machine, and wherein only the particular virtual machine directly interacts with a network card in a hardware platform of the physical machine;

a virtual machine hypervisor having a single sharing page for sharing between the plurality of virtual machines and the particular virtual machine;

the plurality of virtual machines each configured to write into the single sharing page data packets to be sent to an external machine;

wherein the virtual machine hypervisor further comprises a communication scheduler configured to schedule a page swap between the single sharing page and a blank memory page of the particular virtual machine, such that one or more data packets in the memory page of the particular virtual machine subsequent to the page swap is sent to the external machine.

18. The virtual machine system according to claim 17, further comprising an encapsulator configured to, prior to writing into the single sharing page the data packet to be sent by a respective virtual machine of the plurality of virtual machines to the external machine, encapsulate the data packet in a user memory space of the respective virtual machine according to a particular protocol; and wherein the virtual machine hypervisor further comprises method call means configured to directly write the encapsulated data packet into a single sharing page by a method call.

19. The virtual machine system according to claim 17, wherein the virtual machine hypervisor further comprises a content organizer configured to reorganize data packets to be sent to the external machine in the single sharing page.

20. The virtual machine system according to claim 19, wherein the content organizer is further configured to reorganize the data packets by aggregating, into one data packet, payloads of the data packets with a same destination address and protocol-layer type from a same virtual machine or from different virtual machines running on the same physical machine.

* * * * *